(12) United States Patent
Hamana et al.

(10) Patent No.: US 10,707,715 B2
(45) Date of Patent: Jul. 7, 2020

(54) MOTOR-DRIVEN COMPRESSOR

(71) Applicant: KABUSHIKI KAISHA TOYOTA JIDOSHOKKI, Kariya-shi, Aichi-ken (JP)

(72) Inventors: Shozo Hamana, Kariya (JP); Taku Adaniya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 16/266,657

(22) Filed: Feb. 4, 2019

(65) Prior Publication Data

US 2019/0245404 A1 Aug. 8, 2019

(30) Foreign Application Priority Data

Feb. 7, 2018 (JP) .................................. 2018-020138

(51) Int. Cl.
| H02K 11/00 | (2016.01) |
| H02K 3/34 | (2006.01) |
| F04B 35/04 | (2006.01) |
| H02K 5/22 | (2006.01) |
| H02K 7/00 | (2006.01) |

(Continued)

(52) U.S. Cl.
CPC ............. *H02K 3/345* (2013.01); *F04B 35/04* (2013.01); *H02K 1/165* (2013.01); *H02K 3/50* (2013.01); *H02K 5/225* (2013.01); *H02K 7/003* (2013.01); *H02K 11/33* (2016.01); H02K 7/14 (2013.01); H02K 2203/12 (2013.01)

(58) Field of Classification Search
CPC .......... H02K 5/225; H02K 3/50; H02K 11/33; H02K 2203/09; H02K 2203/12; H02K 3/345; H02K 7/14; H02K 2203/03
USPC .............................. 310/71, 216.127–216.128
See application file for complete search history.

(56) References Cited

U.S. PATENT DOCUMENTS

| 8,840,381 B2 * | 9/2014 | Fukasaku ............ F04C 18/0215 310/71 |
| 9,394,907 B2 | 7/2016 | Fukasaku et al. |

(Continued)

FOREIGN PATENT DOCUMENTS

| JP | 2014-034918 A | 2/2014 |
| JP | 2014-114795 A | 6/2014 |

(Continued)

*Primary Examiner* — Thanh Lam
(74) *Attorney, Agent, or Firm* — Sughrue Mion, PLLC

(57) ABSTRACT

A motor-driven compressor includes a cluster block, which accommodates a connecting terminal. The connecting terminal connects an electric motor to a motor driving circuit. A second insulator includes a tubular base, extended portions, which extend from the base, and insulator flanges. Each insulator flange is located on an opposite end of each extended portion from the base. The cluster block is fastened to some of the insulator flanges on the opposite side of the insulator flanges from the extended portions. The cluster block includes a second wall, which faces some of the insulator flanges. The second wall includes engagement pieces, which project in the radial direction of the rotary shaft. The engagement pieces are each fitted to an opening portion, which is a gap between the insulator flanges that are adjacent to each other in the circumferential direction of the rotary shaft.

3 Claims, 4 Drawing Sheets

(51) Int. Cl.
*H02K 11/33* (2016.01)
*H02K 1/16* (2006.01)
*H02K 3/50* (2006.01)
*H02K 7/14* (2006.01)

(56) References Cited

U.S. PATENT DOCUMENTS

| | | | |
|---|---|---|---|
| 9,882,444 B2* | 1/2018 | Murakami | H02K 5/225 |
| 2013/0189091 A1* | 7/2013 | Yamada | F04C 23/02 |
| | | | 415/191 |
| 2014/0093408 A1* | 4/2014 | Adaniya | F04C 23/008 |
| | | | 417/410.5 |
| 2015/0214805 A1* | 7/2015 | Kobayashi | F01C 21/10 |
| | | | 310/71 |
| 2015/0303762 A1 | 10/2015 | Hagita et al. | |
| 2017/0279325 A1* | 9/2017 | Hamana | F04C 29/0085 |
| 2018/0097419 A1* | 4/2018 | Suzuki | F04C 29/0085 |
| 2018/0159399 A1 | 6/2018 | Bitzer et al. | |
| 2019/0203715 A1* | 7/2019 | Heo | H02K 3/50 |

FOREIGN PATENT DOCUMENTS

| | | |
|---|---|---|
| JP | 2015-183668 A | 10/2015 |
| WO | 2016/177569 A2 | 11/2016 |

\* cited by examiner

MOTOR-DRIVEN COMPRESSOR

BACKGROUND

The present disclosure relates to a motor-driven compressor.

A motor-driven compressor disclosed in Japanese Laid-Open Patent Publication No. 2015-183668 includes a rotary shaft, an electric motor, a compression portion, which compresses refrigerant, and a motor driving circuit, which drives the electric motor. The electric motor rotates the rotary shaft to drive the compression portion.

The stator includes a stator core and insulators, which are located on axial ends of the stator core. The stator core includes a tubular core base and teeth, which extend radially inward from the core base. The insulators also include a tubular base and extended portions, which extend radially inward from the base. The stator includes coils, which are formed by winding a conducting wire around each tooth and the associated extended portions.

The motor-driven compressor includes a connecting terminal, which electrically connects the electric motor to the motor driving circuit, and a cluster block, which accommodates the connecting terminal. The cluster block is located to be adjacent to an axial ends of the coils. A projection formed on one of the insulators is fitted to a fitting hole formed in the cluster block. Thus, the cluster block is mounted on the insulator.

In the above-described motor-driven compressor, the cluster block is located to be adjacent to the coils in the axial direction. Thus, a large part of the cluster block projects in the axial direction from the opposite end of the insulator from the stator core. The projecting section of the cluster block is one of the causes of the increase in the size of the motor-driven compressor in the axial direction of the rotary shaft.

SUMMARY

Accordingly, it is an objective of the present invention to provide a motor-driven compressor that is reduced in size in the axial direction of the rotary shaft.

In accordance with a first aspect of the present disclosure, a motor-driven compressor is provided that includes a rotary shaft, an electric motor, a compression portion, a motor driving circuit, a housing, a connecting terminal, and a cluster block. The electric motor includes a stator and a rotor, the electric motor rotating the rotary shaft. The compression portion is driven by rotation of the rotary shaft and compresses a refrigerant. The motor driving circuit drives the electric motor. The housing accommodates the electric motor, the compression portion, and the motor driving circuit. The connecting terminal electrically connects the electric motor to the motor driving circuit. The cluster block accommodates the connecting terminal. The stator includes as stator core, an insulator, and a coil. The stator core includes a tubular core base and a plurality of teeth extending in a radial direction from the core base. The insulator includes a tubular base, which contacts an end surface of the core base, a plurality of extended portions, which extend from the base in the radial direction and contact the teeth, and an insulator flange, which is located at an opposite end of each extended portion from the base and projects in an opposite direction from the stator core. The coil is formed by winding a conducting wire around each tooth and the associated extended portion. The insulator flange is configured to contact the coil to prevent the coil from moving radially inward. The cluster block is fastened to at least a pair of the insulator flanges on an opposite side of the insulator flanges from the extended portions. The cluster block includes an opposed surface facing some of the insulator flanges in a radial direction of the rotary shaft. The opposed surface includes an engagement piece, which projects in the radial direction of the rotary shaft. The engagement piece is fitted to an opening portion, which is a gap between the insulator flanges that are adjacent to each other in a circumferential direction of the rotary shaft.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A motor-driven compressor according to an embodiment will now be described with reference to FIGS. 1 to 5. In the following description, an axial direction refers to the axial direction of the rotary shaft. A circumferential direction refers to the circumferential direction of the rotary shaft and the circumferential direction of the core base.

Figure 1:
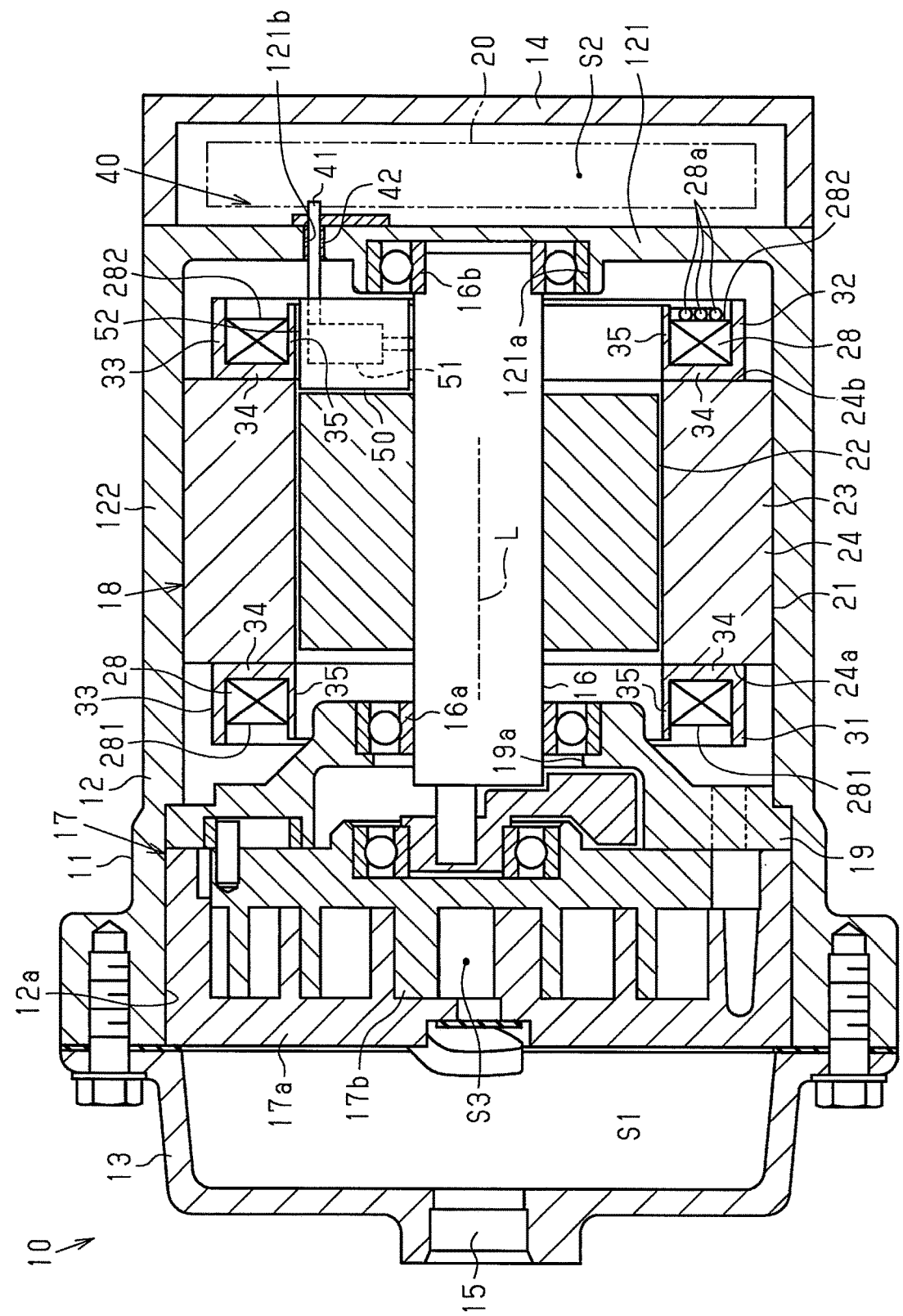
FIG. 1 is a cross-sectional side view of a motor-driven compressor according to an embodiment of the present invention.

As shown in FIG. 1, the motor-driven compressor 10 includes a housing 11. The housing 11 includes a cup-shaped motor housing 12 and a cup-shaped discharge housing 13. The motor housing 12 has an opening 12a on the left end shown in FIG. 1. The discharge housing 13 is coupled to the left end of the motor housing 12. The motor housing 12 includes a bottom wall 121 and a circumferential wall 122. A cup-shaped inverter cover 14 is mounted on the bottom wall 121. A discharge chamber S1 is defined between the motor housing 12 and the discharge housing 13. The bottom wall of the discharge housing 13 includes a discharge port 15. The discharge port 15 is connected to a non-illustrated external refrigerant circuit. The circumferential wall 122 includes a non-illustrated suction port. The suction port is connected to the external refrigerant circuit.

The motor housing 12 accommodates a rotary shaft 16. The motor housing 12 further accommodates a compression portion 17, which compresses refrigerant, and an electric motor 18, which drives the compression portion 17. The electric motor 18 drives the rotary shaft 16 to drive the compression portion 17. The electric motor 18 is located closer to the bottom wall 121 than the compression portion 17.

A shaft support 19 is located between the compression portion 17 and the electric motor 18 in the motor housing 12. The shaft support 19 includes an insertion hole 19a formed at its central portion. A first end of the rotary shaft 16 is inserted in the insertion hole 19a. A radial bearing 16a is located between the insertion hole 19a and the first end of the rotary shaft 16. The first end of the rotary shaft 16 is rotationally supported by the shaft support 19 via the radial bearing 16a.

A bearing portion 121a, which is formed by a recess, is provided on the bottom wall 121 of the motor housing 12. A second end of the rotary shaft 16 is inserted inside the bearing portion 121a. A radial bearing 16b is provided between the bearing portion 121a and the second end of the rotary shaft 16. The second end of the rotary shaft 16 is rotationally supported by the bearing portion 121a via the radial bearing 16b.

The bottom wall 121 of the motor housing 12 and the inverter cover 14 define an accommodation space S2. A motor driving circuit 20 shown by the long dashed double-short dashed line in FIG. 1 is located in the accommodation space S2. The motor driving circuit 20 is mounted on the outer surface of the bottom wall 121. The compression portion 17, the electric motor 18, and the motor driving circuit 20 are arranged along an axis L of the rotary shaft 16 in this order.

The compression portion 17 includes a fixed scroll 17a, which is secured in the motor housing 12, and a movable scroll 17b, which faces the fixed scroll 17a. The fixed scroll 17a and the movable scroll 17b define a compression chamber S3. The compression chamber S3 is configured to be capable of changing its volume.

The electric motor 18 includes a tubular stator 21 and a tubular rotor 22, which is located inside the stator 21. The electric motor 18 is an inner rotor electric motor. The rotor 22 rotates integrally with the rotary shaft 16.

Figure 2:
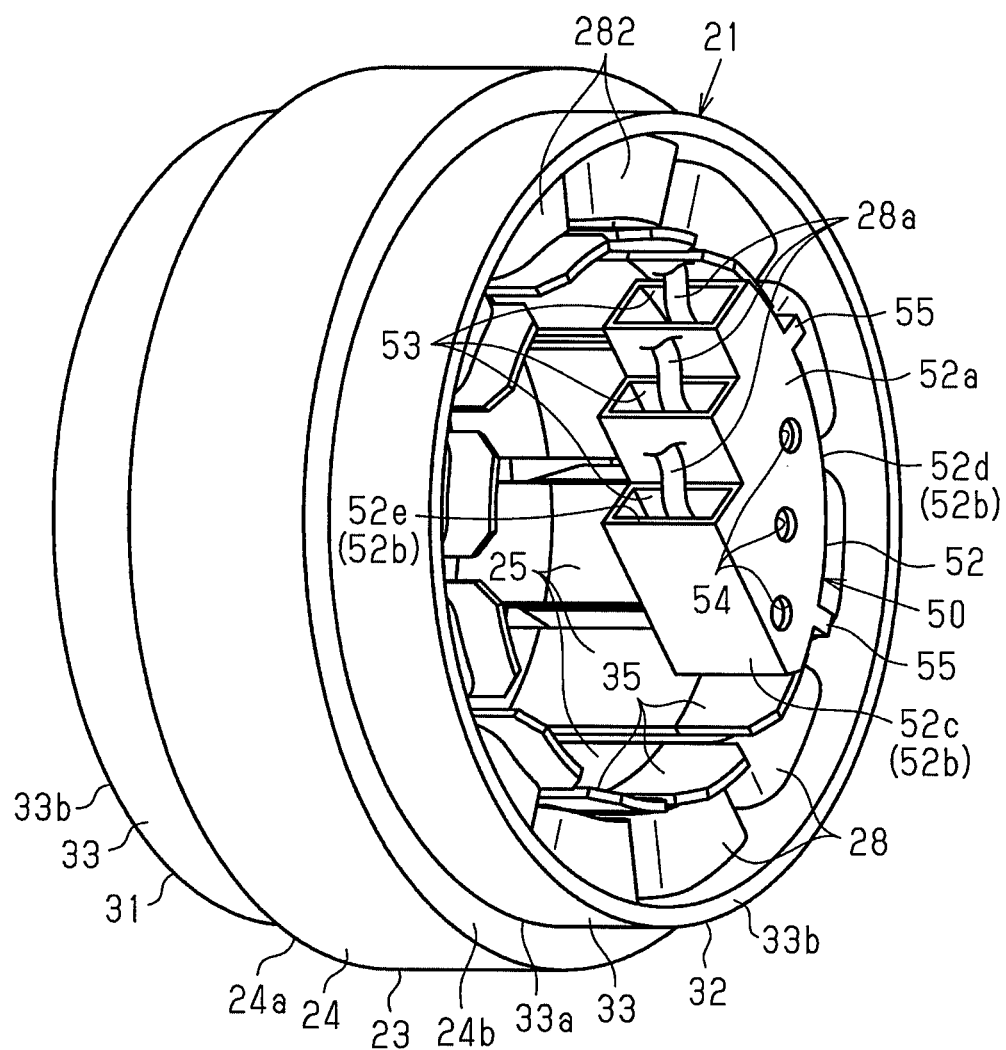
FIG. 2 is a perspective view of the stator and the cluster block.
Figure 3:
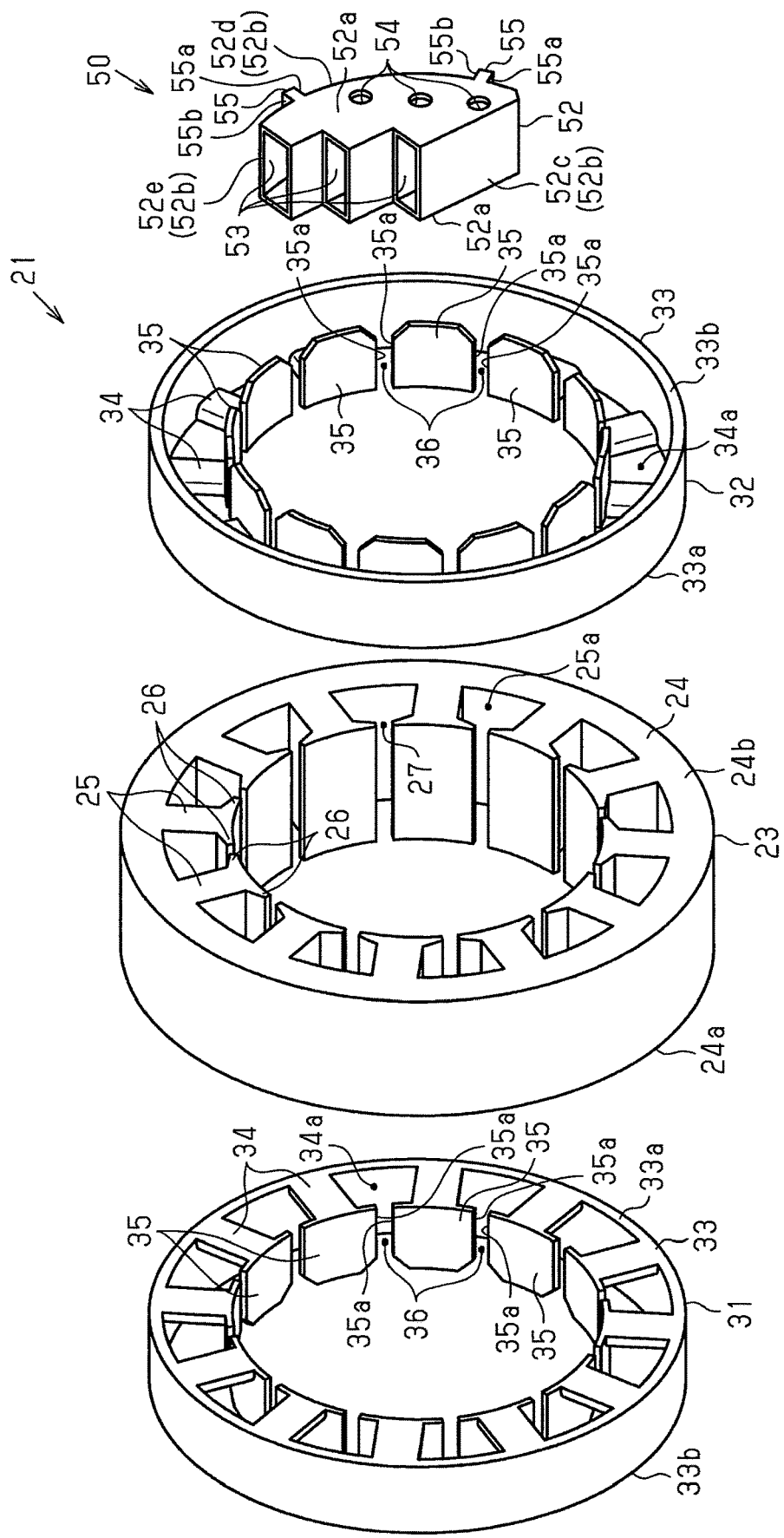
FIG. 3 is an exploded perspective view of the stator and the cluster block.

As shown in FIGS. 2 and 3, the stator 21 includes a stator core 23 and slots 27. The stator core 23 includes a cylindrical core base 24, which is secured to the inner circumferential surface of the motor housing 12, and teeth 25, which extend radially inward from the inner circumferential surface of the core base 24. The teeth 25 are formed at equal intervals in the circumferential direction of the rotary shaft 16. The end surface of each tooth 25 opposite from the core base 24 extends in the axial direction along the outer circumferential surface of the rotor 22. Furthermore, a pair of core flanges 26 are formed on the opposite end of each tooth 25 from the core base 24. The pair of core flanges 26 project in the circumferential direction from the sides of the end of each tooth 25. The slots 27 are gaps between the core flanges 26 that are adjacent to one another in the circumferential direction. The dimension of the teeth 25 in the axial direction is the same as the dimension of the core base 24 in the axial direction. The dimension of the stator core 23 in the axial direction is greater than the dimension of the rotor 22 in the axial direction.

As shown in FIG. 1, the stator 21 includes a first insulator 31 and a second insulator 32. The core base 24 includes, as the end surfaces in the axial direction, a first end surface 24a, which faces the compression portion 17, and a second end surface 24b, which faces the motor driving circuit 20. The first insulator 31 is located adjacent to the first end surface 24a of the core base 24, and the second insulator 32 is located adjacent to the second end surface 24b of the core base 24. Thus, the stator core 23 is sandwiched between the first insulator 31 and the second insulator 32 in the axial direction of the rotary shaft 16.

As shown in FIG. 3, the first insulator 31 and the second insulator 32 each include a cylindrical base 33, columnar extended portions 34, which extend radially inward from the inner circumferential surface of the base 33, and plate-like insulator flanges 35, which are located on the opposite ends of the extended portions 34 from the base 33. The extended portions 34 are formed at equal intervals in the circumferential direction of the base 33. The number of the extended portions 34 is equal to the number of the teeth 25. The first insulator 31 and the second insulator 32 each include a first end surface 33a and a second end surface 33b as the end surfaces in the axial direction.

The first end surface 33a of the first insulator 31 contacts the first end surface 24a of the core base 24. The first end surface 33a of the second insulator 32 contacts the second end surface 24b of the core base 24. The ends of the extended portions 34 close to the base 33 are connected to the inner circumferential surface of the base 33 in the vicinity of the first end surface 33a. The extended portions 34 of the first insulator 31 contact the teeth 25. The extended portions 34 of the second insulator 32 also contact the teeth 25.

The insulator flanges 35 project on the opposite side from the stator core 23 in the axial direction. That is, the insulator flanges 35 project toward the second end surface 33b, which is reverse from the first end surface 33a. The inner circumferential surface of each insulator flange 35 on the opposite side from the base 33 curves in such a manner that the insulator flange 35 bulges toward the base 33. The width of the insulator flanges 35 in the circumferential direction is greater than the width of the extended portions 34 in the circumferential direction. The first insulator 31 and the second insulator 32 each include opening portions 36. The opening portions 36 are gaps between edges 35a of the insulator flanges 35 that are adjacent to one another in the circumferential direction. The edges 35a extend in the axial direction of the base 33. Thus, the edges 35a of the insulator flanges 35 that are adjacent to each other in the circumferential direction are parallel to each other. The opening portions 36 of the first insulator 31 and the opening portions 36 of the second insulator 32 are continuous with the slots 27 of the stator core 23 in the axial direction. Thus, when viewed from the axial direction of the rotary shaft 16, the opening portions 36 of the first insulator 31, the opening portions 36 of the second insulator 32, and the slots 27 of the stator core 23 communicate with one another.

As shown in FIGS. 1 and 2, the stator 21 includes coils 28. The coils 28 are each formed by winding a conducting wire around the associated tooth 25 of the stator core 23, the associated extended portion 34 of the first insulator 31, and the associated extended portion 34 of the second insulator 32 in concentrated winding. The coils 28 that are adjacent to each other in the circumferential direction have different phases (U, V, and W phases) from each other. Part of each coil 28 passes through a first space 25a formed between the teeth 25 that are adjacent to each other in the circumferential direction shown in FIG. 3. Each coil 28 includes a first coil end 281, which projects from the first space 25a in the vicinity of the first end surface 24a of the core base 24, and a second coil end 282, which projects from the first space 25a in the vicinity of the second end surface 24b of the core base 24.

The first coil end 281 passes through a second space 34a shown in FIG. 3 formed between the extended portions 34 that are adjacent to each other in the circumferential direction and a space defined by the inner circumferential surface of the base 33, each insulator flange 35, and the associated extended portion 34 and located on the opposite side of the extended portion 34 from the teeth 25. The second coil end 282 also passes through the second space 34a shown in FIG. 3 formed between the extended portions 34 that are adjacent to each other in the circumferential direction and a space defined by the inner circumferential surface of the base 33, each insulator flange 35, and the associated extended portion 34 and located on the opposite side of the extended portion 34 from the teeth 25.

A method for forming the coils 28 includes, for example, winding a conducting wire around each tooth 25 and the associated extended portions 34 in concentrated winding while passing a conducting wire winding nozzle through the associated slots 27 of the stator core 23, the associated opening portions 36 of the first insulator 31, and the associated opening portions 36 of the second insulator 32. The method also includes previously winding a conducting wire into a ring shape to form the coil 28 and subsequently inserting each coil 28 into the first spaces 25a through the slots 27 and the second spaces 34a through the opening portions 36 without using the conducting wire winding nozzle.

The sections of each coil 28 that pass through the first spaces 25a are insulated from the stator core 23 by non-illustrated insulation sheets. The first coil end 281 of each coil 28 contacts the base 33 of the first insulator 31, and the second coil end 282 of each coil 28 contacts the base 33 of the second insulator 32. This prevents each coil 28 from moving radially outward. Furthermore, the first coil end 281 of each coil 28 contacts the associated insulator flange 35 of the first insulator 31, and the second coil end 282 of each coil 28 contacts the associated insulator flange 35 of the second insulator 32. This prevents each coil 28 from moving radially inward. Each first coil end 281 is insulated from the associated tooth 25 of the stator core 23 by the associated extended portion 34 of the first insulator 31. Each second coil end 282 is insulated from the associated tooth 25 of the stator core 23 by the associated extended portion 34 of the second insulator 32.

A first end of the conducting wire is drawn from the second coil end 282 of each of the coils 28 corresponding to the U, V, and W phases. The first ends of the conducting wires of the same phase are bundled into a motor wire 28a. The motor wire 28a is drawn from the second coil ends 282. A second end of the conducting wire is drawn from the second coil end 282 of each of the coils 28 corresponding to the U, V, and W phases. The second ends of the conducting wires of the phases are electrically connected to one another at a non-illustrated neutral point.

As shown in FIG. 1, the bottom wall 121 includes a through-hole 121b. A hermetic terminal 40 is located in the through-hole 121b. The hermetic terminal 40 includes three conductive members 41 (only one is shown in FIG. 1) corresponding to the coils 28 of the U, V, and W phases. The conductive members 41 are columnar metal terminals that extend straight and are inserted in the through-hole 121b. A first end of each conductive member 41 is electrically connected to the motor driving circuit 20 in the accommodation space S2. A second end of each conductive member 41 projects in the motor housing 12. The hermetic terminal 40 includes an insulation member 42 made of glass. The insulation member 42 secures the conductive members 41 to the bottom wall 121 while insulating the conductive members 41 from the bottom wall 121.

The motor housing 12 accommodates a connector 50. The connector 50 includes three connecting terminals 51 (only one is shown in FIG. 1) corresponding to the coils 28 of the U, V, and W phases and an insulative cluster block 52, which accommodates the connecting terminals 51. The cluster block 52 is fastened to some (four in the present embodiment) of the insulator flanges 35 of the second insulator 32 on the opposite side of the insulator flanges 35 from the extended portions 34. That is, the cluster block 52 is located radially inward of the second insulator 32. The cluster block 52 is located to be adjacent to the rotor 22 in the axial direction.

Figure 4:
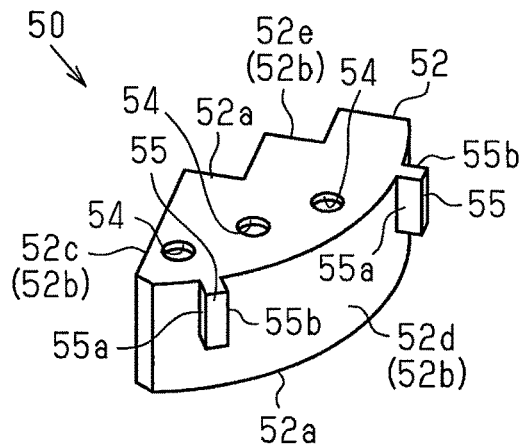
FIG. 4 is a perspective view of the cluster block.

As shown in FIGS. 2 to 4, the cluster block 52 is a flat box. The cluster block 52 includes a pair of flat walls 52a and coupling walls 52b, which couple the pair of flat walls 52a. The coupling walls 52b include a planar first wall 52c, a second wall 52d, which curves in the same manner as the inner circumferential surfaces of the insulator flanges 35, and a step-like third wall 52e. The third wall 52e couples the first wall 52c to the second wall 52d. One of the flat walls 52a faces the end surface of the rotor 22 in the axial direction in the vicinity of the motor driving circuit 20. Furthermore, the outer surface of the second wall 52d is an opposed surface that faces some (four in the present embodiment) of the insulator flanges 35 in the radial direction.

The third wall 52e includes three first insertion holes 53. As shown in FIG. 2, the end of each motor wire 28a drawn from the associated coils 28 is inserted in one of the first insertion holes 53. The motor wires 28a inserted in the first insertion holes 53 are electrically connected to the connecting terminals 51. One of the flat walls 52a includes three second insertion holes 54 through which the conductive members 41 are inserted.

As shown in FIG. 4, two engagement pieces 55 are formed on the outer surface of the second wall 52d. The engagement pieces 55 project in the radial direction of the rotary shaft 16. Each engagement piece 55 extends straight in a direction orthogonal to the pair of flat walls 52a. The two engagement pieces 55 are formed at different positions in the circumferential direction.

Figure 5:
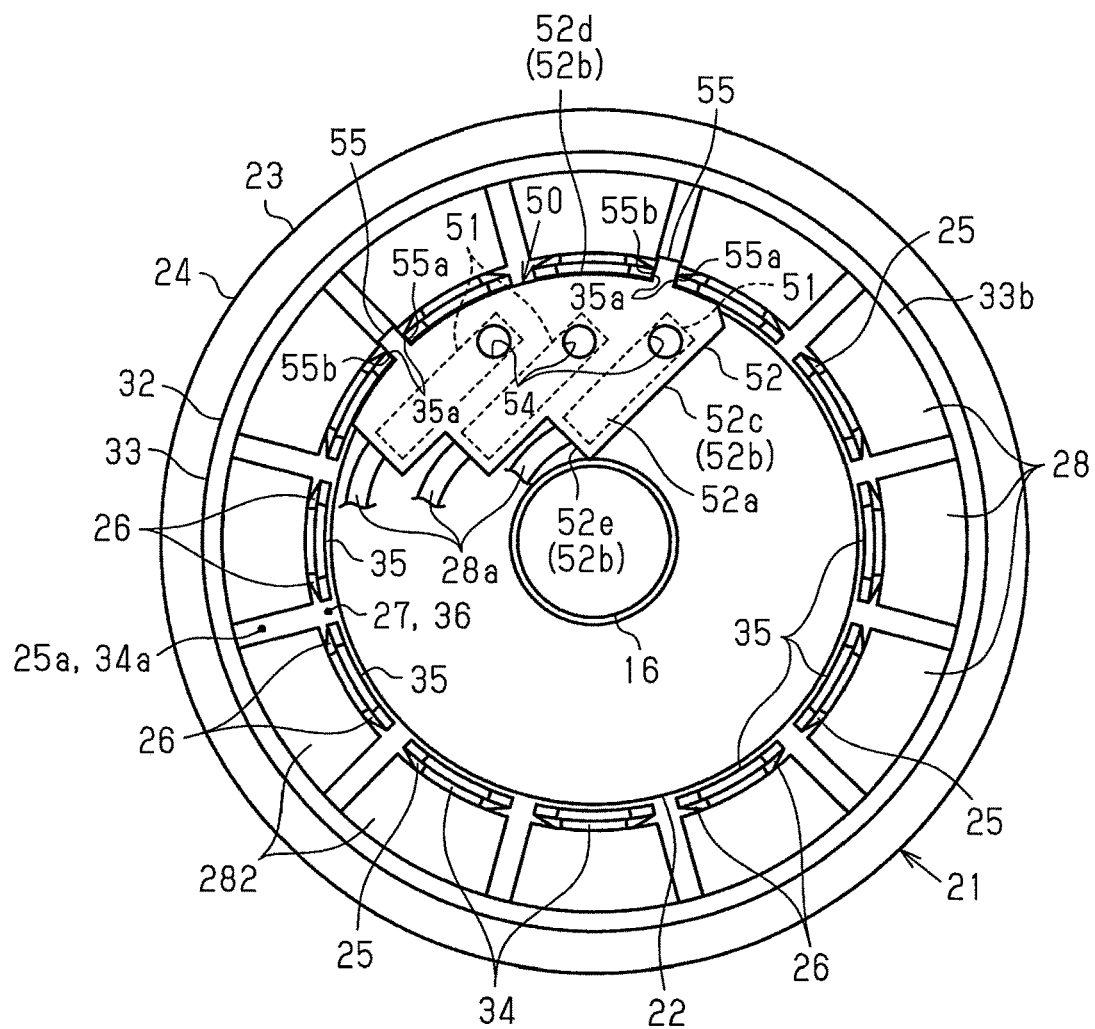
FIG. 5 is a front view of the electric motor and the cluster block.

As shown in FIG. 5, the dimension of the engagement pieces 55 in the circumferential direction is the same as the distance between the edges 35a of the insulator flanges 35 that are adjacent to each other in the circumferential direction and the dimension of the opening portions 36 in the circumferential direction. Each engagement piece 55 is fitted to one of the opening portions 36 of the second insulator 32. The opening portion 36 in which one of the two engagement pieces 55 is fitted and the opening portion 36 in which the other one of the two engagement pieces 55 is fitted are formed at different positions in the circumferential direction.

The cluster block 52 is fastened to the second insulator 32 by fitting the engagement pieces 55 to the associated opening portions 36. In this state, a first edge 55a of each engagement piece 55 abuts against the edge 35a of one of the two adjacent insulator flanges 35. A second edge 55b of the engagement piece 55 abuts against the edge 35a of the other one of the two adjacent insulator flanges 35.

The second end of each conductive member 41 is inserted in one of the second insertion holes 54 of the cluster block 52, which is mounted on the second insulator 32, and is electrically connected to one of the connecting terminals 51. Thus, the electric motor 18 is electrically connected to the motor driving circuit 20 via the motor wires 28a, the connecting terminals 51, and the conductive members 41. Electric power is supplied to the electric motor 18 from the motor driving circuit 20 via the conductive members 41, the connecting terminals 51, and the motor wires 28a. The electric motor 18 is driven by the electric power to rotate the rotary shaft 16. This drives the compression portion 17, and the refrigerant is compressed by the compression portion 17.

Advantages of the present embodiment will be described together with its operation.

(1) The cluster block 52 is fastened to some of the insulator flanges 35 of the second insulator 32 on the opposite side of the insulator flanges 35 from the extended portions 34. In this case, compared with a conventional case in which the cluster block is located adjacent to the coil in the axial direction, part of the cluster block 52 that projects in the axial direction from the opposite end of the second insulator 32 from the stator core 23 is reduced. This inhibits the size of the motor-driven compressor 10 from being increased in the axial direction of the rotary shaft 16.

(2) The opening portions 36 of the second insulator 32 are continuous with the slots 27 of the stator core 23 in the axial direction. The method for forming the coils 28 includes, for example, winding a conducting wire around each tooth 25 and the associated extended portions 34 in concentrated winding while passing the conducting wire winding nozzle through the associated slots 27 of the stator core 23, the associated opening portions 36 of the first insulator 31, and the associated opening portions 36 of the second insulator 32. In this case, the opening portions 36 of the first insulator 31 and the second insulator 32 are necessary for winding the conducting wire around each tooth 25 and the associated extended portions 34. The opening portions 36 of the first insulator 31 and the second insulator 32 are existing structures.

In this respect, according to the present embodiment, the cluster block 52 is mounted on the second insulator 32 by fitting the engagement pieces 55 to the opening portions 36 of the second insulator 32, which are the existing structures. Thus, it is unnecessary to form a section on the second insulator 32 for mounting the cluster block on the insulator as in the conventional technique. This prevents the structure of the second insulator 32 from being complicated and simplifies the structure.

(3) Two engagement pieces 55 are formed on the outer surface of the second wall 52d. The two engagement pieces 55 are capable of being fitted to the opening portions 36, which are formed at different positions in the circumferential direction. This stabilizes the mounting state of the cluster block 52 on the second insulator 32 compared with a case in which only one engagement piece 55 is formed on the outer surface of the second wall 52d. Thus, even if load is applied to the cluster block 52 from the conductive members 41 when the conductive members 41 are connected to the connecting terminals 51, which are accommodated in the cluster block 52, the cluster block 52 resists being detached from the second insulator 32.

(4) When viewed from the axial direction of the rotary shaft 16, the opening portions 36 of the first insulator 31, the opening portions 36 of the second insulator 32, and the slots 27 of the stator core 23 communicate with one another. With this configuration, it is possible to visually check the fitting state of the engagement pieces 55 of the cluster block 52 to the opening portions 36 of the second insulator 32 from the opening 12a of the motor housing 12 before mounting the shaft support 19. Thus, whether the cluster block 52 is mounted on the second insulator 32 or not is easily checked.

The above-described embodiment may be modified as follows.

The number of the engagement pieces 55 formed on the second wall 52d is not limited to two. One or more than two engagement pieces 55 may be formed on the second wall 52d. When the engagement pieces 55 are formed on the cluster block 52, the engagement pieces 55 are formed at different positions in the circumferential direction. Thus, the engagement pieces 55 are fitted to the opening portions 36, which are formed at different positions in the circumferential direction.

The shape of the cluster block 52 may be changed as required. For example, the first wall 52c does not necessarily have to be flat, but may be curved. The second wall 52d does not necessarily have to be curved, but may be flat. The third wall 52e does not necessarily have to have the steps, but may be flat.

The number of the phases of the coils 28 may be changed.

The coils 28 may be formed by winding conducting wires around the teeth 25 and the extended portions 34 by distributed winding.

The electric motor 18 may be an outer rotor electric motor, which includes a tubular stator and a rotor located outside the stator. In the outer rotor electric motor, the stator core 23 includes the teeth 25 that extend radially outward from the outer circumferential surface of the core base 24, and the first insulator 31 and the second insulator 32 include the extended portions 34 that extend radially outward from the outer circumferential surface of the base 33. In this case also, the engagement pieces 55 of the cluster block 52 are fitted to the opening portions 36 on the opposite side of the insulator flanges 35 of the second insulator 32 from the extended portions 34. That is, the cluster block 52 is located radially outward of the second insulator 32 to be adjacent to the rotor 22 in the axial direction.

The compression portion 17, the electric motor 18, and the motor driving circuit 20 do not necessarily have to be arranged in this order. For example, the inverter cover 14 may be mounted on the circumferential wall 122 of the motor housing 12. The space defined by the circumferential wall 122 of the motor housing 12 and the inverter cover 14 may be set as the accommodation space S2, and the motor driving circuit 20 may be accommodated in the accommodation space S2.

The compression portion 17 does not necessarily have to be configured with the fixed scroll 17a and the movable scroll 17b, but may be changed to, for example, a piston- or vane-type compression portion.

The invention claimed is:
1. A motor-driven compressor comprising:
a rotary shaft;
an electric motor including a stator and a rotor, the electric motor rotating the rotary shaft;
a compression portion, which is driven by rotation of the rotary shaft and compresses a refrigerant;
a motor driving circuit, which drives the electric motor;
a housing, which accommodates the electric motor, the compression portion, and the motor driving circuit;
a connecting terminal, which electrically connects the electric motor to the motor driving circuit; and
a cluster block, which accommodates the connecting terminal, wherein
the stator includes
a stator core, which includes a tubular core base and a plurality of teeth extending in a radial direction from the core base,
an insulator including a tubular base, which contacts an end surface of the core base, a plurality of extended portions, which extend from the base in the radial direction and contact the teeth, and an insulator flange, which is located at an opposite end of each extended portion from the base and projects in an opposite direction from the stator core, and
a coil formed by winding a conducting wire around each tooth and the associated extended portion,
wherein the insulator flange is configured to contact the coil to prevent the coil from moving radially inward, the cluster block is fastened to at least a pair of the insulator flanges on an opposite side of the insulator flanges from the extended portions, the cluster block includes an opposed surface facing some of the insulator flanges in a radial direction of the rotary shaft, the opposed surface includes an engagement piece, which projects in the radial direction of the rotary shaft, and the engagement piece is fitted to an opening portion, which is a gap between the insulator flanges that are adjacent to each other in a circumferential direction of the rotary shaft.

2. The motor-driven compressor according to claim 1, wherein the stator core includes a pair of core flanges on an opposite end of each tooth from the core base, the core flanges projecting from sides of the end in a circumferential direction of the core base, and each opening portion is continuous with a slot in an axial direction of the rotary shaft, the slot being a gap between the core flanges that are adjacent to each other in the circumferential direction of the core base.

3. The motor-driven compressor according to claim 1, wherein the opposed surface includes a plurality of engagement pieces, which are formed at different positions in the circumferential direction of the rotary shaft, and the engagement pieces are fitted to the associated opening portions.

* * * * *